United States Patent [19]
DiLoreto et al.

[11] Patent Number: 6,076,933
[45] Date of Patent: Jun. 20, 2000

[54] LIGHT TRANSMITTING AND DISPERSING FILTER HAVING LOW REFLECTANCE

[75] Inventors: John R. DiLoreto, Campbell; Dennis W. Vance, Paso Robles, both of Calif.

[73] Assignee: Jenmar Visual Systems, Sunnyvale, Calif.

[21] Appl. No.: 09/012,474

[22] Filed: Jan. 23, 1998

Related U.S. Application Data

[63] Continuation-in-part of application No. 08/729,803, Oct. 7, 1996, Pat. No. 5,781,344.
[51] Int. Cl.$^7$ .............................. G02B 27/00; G02B 21/60
[52] U.S. Cl. .......................... 359/614; 359/452; 359/613
[58] Field of Search ............................. 359/443, 452–457, 359/536–542, 599, 613–615, 460–461, 498–500

[56] References Cited

U.S. PATENT DOCUMENTS 5,563,738  10/1996  Vance ....................................... 359/614
5,781,344   7/1998  Vance ....................................... 359/614

*Primary Examiner*—Thong Nguyen
*Attorney, Agent, or Firm*—Fenwick & West LLP

[57] ABSTRACT

Single-layer and multi-layer light filters each having an array of light transmissive beads provide substantially independent and simultaneously optimized control of optical properties such as gain, contrast, transmittance, dispersion, and ambient light rejection using additional light transmissive layers. Such light filters can include light transmissive layers defining a lens curved over a plurality of the beads for effecting greater dispersion of image light horizontally or vertically, and conformal layers defining a lens curved over individual beads for increasing an effective radius of curvature of such beads. Additional pluralities of smaller beads are included in interstitial gaps in an array of larger beads for improving transmittance of some embodiments of light filters of the present invention. Light filters of the present invention are beneficially used as rear projection screens and light diffusers, and are ideal for use in or with flat-panel displays and the like.

23 Claims, 11 Drawing Sheets

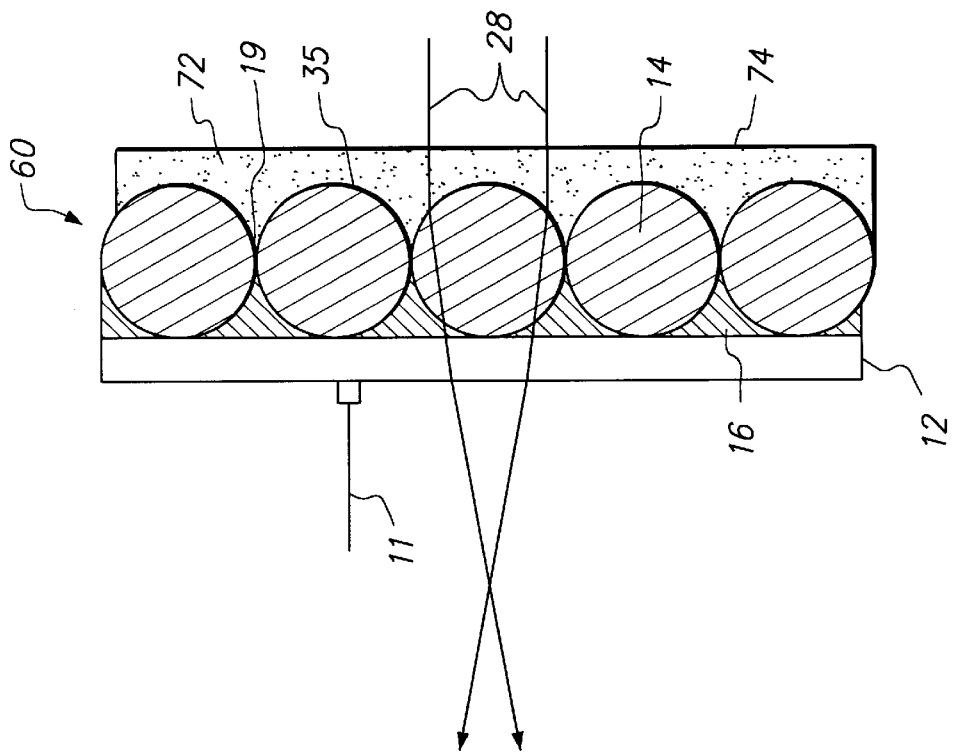
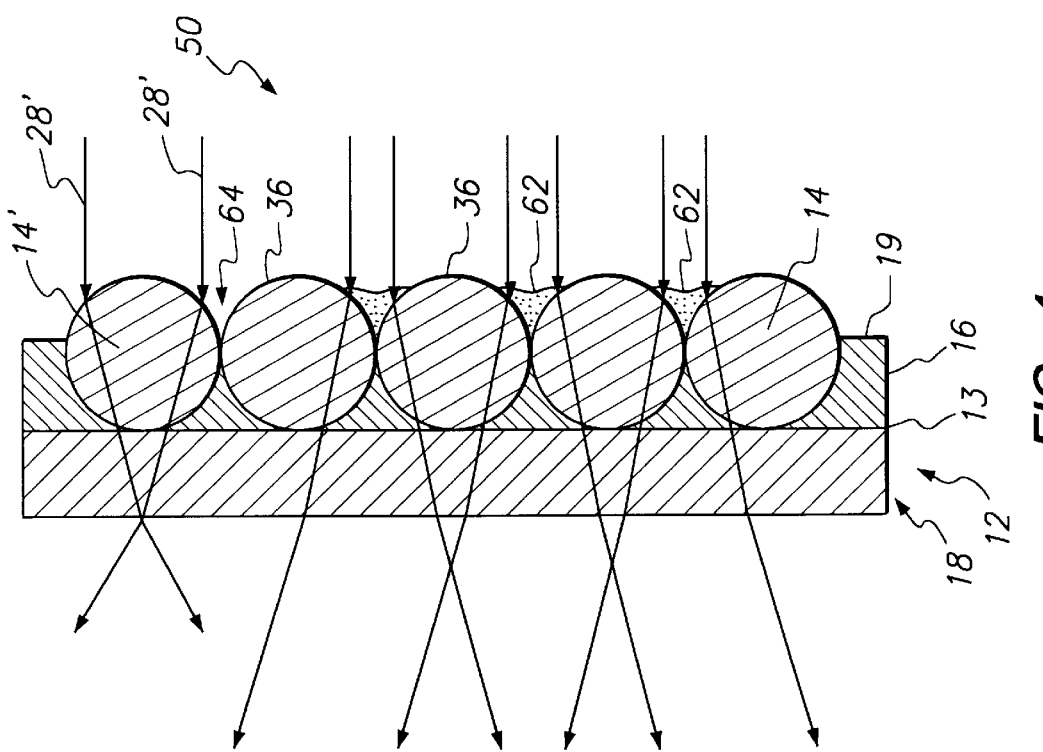

LIGHT TRANSMITTING AND DISPERSING FILTER HAVING LOW REFLECTANCE

RELATED CASES

This is a continuation-in-part application of application Ser. No. 08/729,803 entitled "A Light Transmitting And Dispersing Filter Having Low Reflectance", filed on Oct. 7, 1996 by Dennis W. Vance, now U.S. Pat. No. 5,781,344; and the subject matter of this application is related to the subject matter of U.S. Pat. No. 5,563,738, issued on Oct. 8, 1996, which subject matter is incorporated herein by this reference.

FIELD OF THE INVENTION

This invention relates to light filters, and in particular to light filters for rear projection screens, display enhancement, and other optical uses requiring dispersive light control.

BACKGROUND OF THE INVENTION

Rear projection screens and light diffusers are light filters which provide an optically diffusing medium for transmitting light from an image source (image light) on one side thereof to a viewer on the opposite side thereof. A conventional single-layer refractive light filter has been described in U.S. Pat. No. 2,378,252, which includes a refracting lens system as its principal component. The refracting lens system comprises an array of spherical glass or resin beads embedded in an opaque binder layer, and is mounted on a transparent support material. Typically, the light filter is oriented with the bead layer toward the image source and the transparent support material toward the viewers. U.S. Pat. No. 3,552,822 discloses a light filter which also includes both an anti-reflection coating and a bead layer oriented away from an image source.

The opaque binder layer serves a number of purposes, including affixing beads to the support material, reducing the reflectivity of the light filter, and reducing the amount of light transmitted through interstices between the beads of the lens system. Light from an image source is refracted by the beads and dispersed to the viewer through a plurality of transmission areas of the beads. These transmission areas each comprise a point of contact between one of the beads and the support material and an area surrounding this point where the opaque binder layer is too thin to absorb substantially the refracted light. As used herein, dispersion refers to spreading light intensity over a range of angles irrespective of its wavelength, and is not limited to variable spreading of light intensity as a function of its frequency or wavelength.

Rear projection screens and light diffusers are characterized by their gain, contrast, resolution, transmittance, dispersion, and ambient light rejection. These properties are determined in part by the structure and composition of the component materials. For example, the gain, which is a measure of the intensity of transmitted light as a function of the viewing angle, is determined largely by the difference in the indices of refraction of the spherical beads and the surrounding media. Similarly, the ambient light rejection and contrast are determined largely by the opacity of the opaque binder layer, and the resolution is determined largely by the size of the beads used in the lens system.

The interdependence of these optical properties, and their dependence on the properties of component materials, limit their simultaneous optimization in conventional single-layer light filters. For example, if the opacity of the opaque binder layer is increased to enhance the ambient light rejection of the light filter, transmission of refracted image light through the transmission areas of the beads will be reduced. Also, with conventional single-layer light filters, a greater percentage of image light is reflected off back surfaces of the beads and lost, relative to light filters of the present invention. The range of indices of refraction of available materials also limits the performance of single-layer light filters.

Multi-layer refractive light filters have been described in U.S. Pat. No. 5,563,738. These light filters include a refracting lens system as their principal component, and further include an additional optical layer or layers for varying the optical properties of the light filters, and for providing improved simultaneous control of image transmission, ambient light rejection, contrast, and gain.

Single-layer and multi-layer light filters which include an array of light transmissive beads typically also include irregularities in the spacing of beads within the array. Such irregularities are formed during manufacture as a result of imperfections in the manufacturing process, and also as a result of the tolerances of component materials. The irregularities typically occur on a somewhat random basis which can appear quasi-periodic, and can give light filters a grainy appearance. Such light filters can exhibit reduced transmittance in front of gaps between the beads caused by the irregularities.

SUMMARY OF THE INVENTION

The present invention comprises single-layer and multi-layer light filters that provide high transmittance, high ambient light rejection, high contrast and resolution, and improved gain control with selected dispersion of image light. The present invention further comprises processes for making such light filters. These processes can also be beneficially utilized to improve the structure and optical properties of various types of light filters which include light transmissive beads and one or more layers of opaque binder.

Some embodiments of light filters of the present invention include one or more layers of light transmissive material having a surface curved over an area larger than at least two of the beads for providing additional control over dispersion of image light to the viewer. In a preferred embodiment, this surface comprises a plurality of substantially parallel columnar lenses for providing a wide viewing angle along a selected direction.

Alternative embodiments of light filters of the present invention include a conformal layer of light transmissive material disposed on the back surfaces of beads and on the back surface of a back most opaque binder layer. This conformal layer defines a plurality of curved lenses, with each such lens being disposed on the back surface of a corresponding bead. These lenses both provide additional control over dispersion of image light, and also increase the transmittance of the light filter. Each such lens can have a substantially uniform thickness and approximately the same center of curvature as the corresponding bead. Such embodiments of the present invention have been shown to exhibit a transmittance of 50 percent, and are believed to have an ideal transmittance of up to 65 percent. In an alternative embodiment of the present invention, each such lens has a center of curvature behind the center of curvature of the corresponding bead. Light filters of the present invention with this latter property are believed to have an ideal transmittance up to 80 percent.

Other alternative embodiments of the present invention reduce a grainy appearance caused by irregularities in an array of beads included in a light filter. These embodiments of the present invention include a first plurality of larger beads arranged in an array and held together by one or more layers of opaque binder. Irregular spacing between the beads of the array are obscured using a second plurality of smaller beads disposed in gaps caused by such irregularities. The smaller beads hide optical effects of the irregularites, which preserves the appearance of fine-grain structure in these light filters. These two pluralities of beads can be deposited separately, or alternatively, can be mixed together and the resulting mixture deposited simultaneously.

The present invention provides means to vary independently and simultaneously numerous optical properties of light filters including transmittance, gain, dispersion of image light, resolution, contrast, and ambient light rejection. Additional optical control is provided by selecting the indices of refraction of component materials over selected ranges relative to a selected index of refraction of component beads. Additional layers of opaque binder and light transmissive material can also be included in light filters of the present invention, for example, over the back surface of an opaque binder layer or the back surfaces of the beads, as an additional means for providing substantially independent control of a variety of optical properties.

Light filters of the present invention can be used, for example, as rear projection screens or as contact light diffusers. In the first case, near-collimated light is incident on the light filter from an image source which is well separated from the light filter. In the latter case, the light filter typically is positioned as a post diffuser directly on an image source, such as a flat-panel display, which is usually back lighted with collimated light.

BRIEF DESCRIPTION OF THE DRAWINGS

FIG. 4 is a diagram of an embodiment of a multi-layer light filter of the present invention in which the interstices between the beads at the back surface of an opaque binder layer have been partially filled with transparent resin to control the gain of the light filter;

FIG. 5 is a diagram of an alternative embodiment of a multi-layer light filter of the present invention including an immersive layer of transparent resin having an index of refraction different from that of the beads for controlling the gain of the light filter;

DETAILED DESCRIPTION OF THE INVENTION

Described herein are various light filters with references to illustrations in the figures. Due to size limitations, these figures illustrate representative portions of these light filters including several or more light transmissive beads. Physical implementations of such light filters for use as viewing screens, light diffusers, and the like, can include larger numbers of light transmissive beads, with typical physical implementations including many thousands of such beads.

Figure 1A:
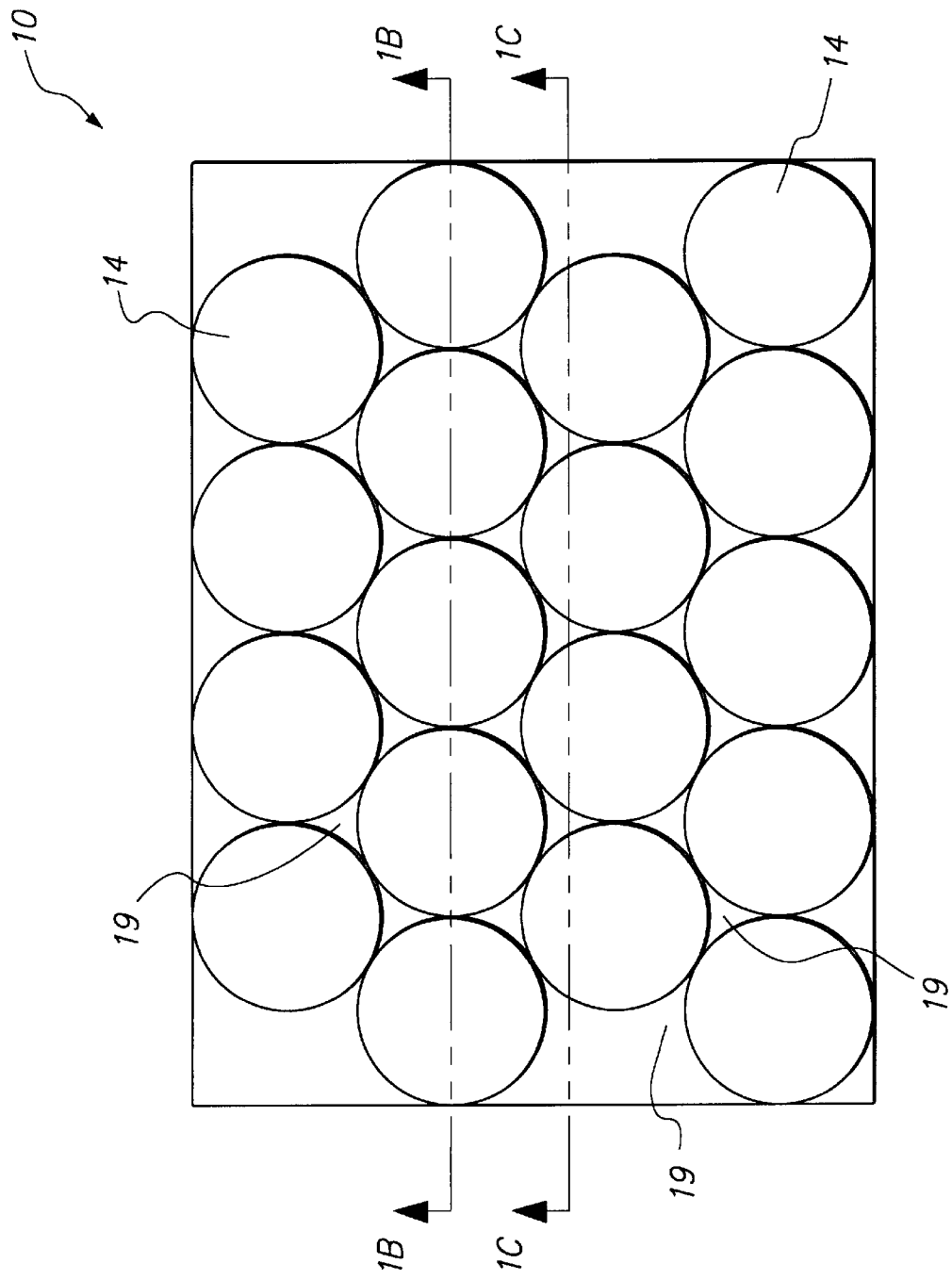
FIGS. 1A, 1B, 1C are diagrams of a conventional single-layer light filter having spherical beads, and cross-sections of this light filter at two different locations.
Figure 1C:
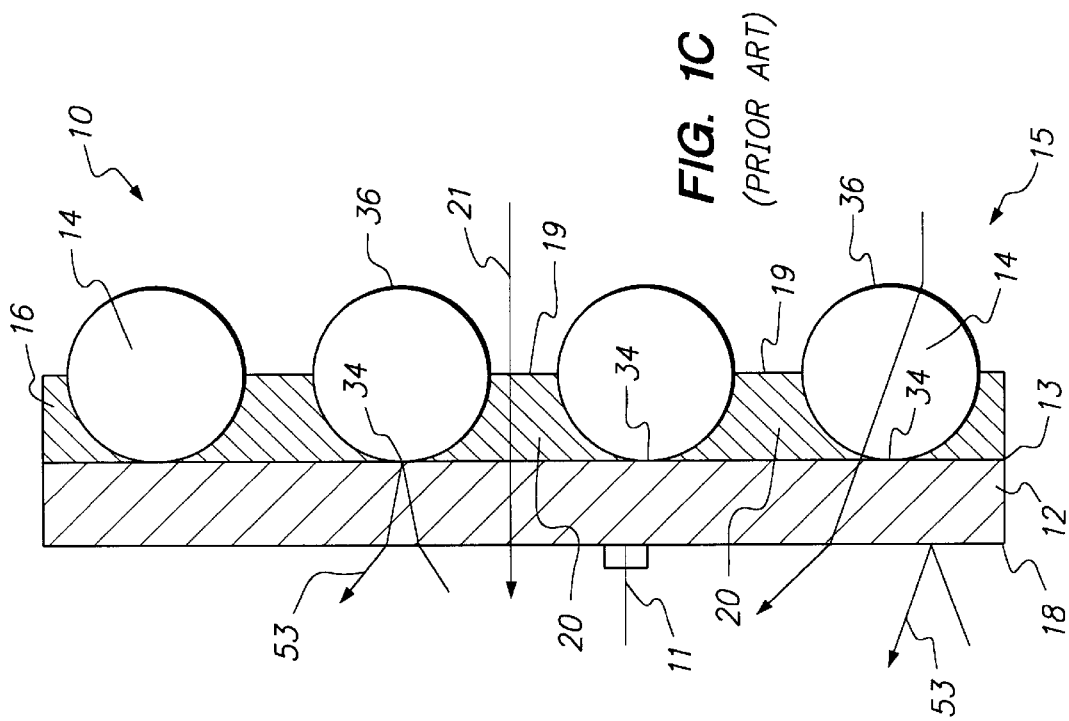
Figure 1B:
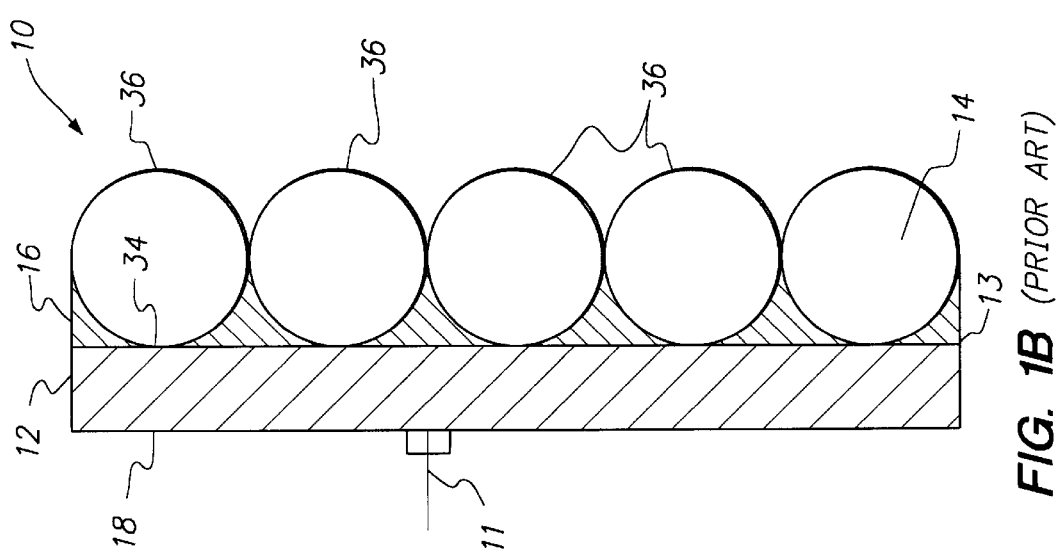

Referring now to FIG. 1A there is shown a diagram of a conventional single-layer light filter 10 having a plurality of light transmissive beads 14 of glass or resin for dispersing image light. Referring now also to FIGS. 1B and 1C, there are shown cross-sections of light filter 10 at the locations indicated in FIG. 1A. The light filter 10 comprises a transparent support material 12 having a filter surface 18 and a support surface 13, a plurality of the beads 14, and an opaque binder layer 16 in which the beads 14 are partially embedded and which binds the beads 14 to the support surface 13.

Light from an image source (not shown) is incident on the light filter 10 at back surfaces 36 of the beads 14 and a back surface 19 of the opaque binder layer 16. These back surfaces 36, 19 together define a back or image side of the light filter 10. Light incident on the back surfaces 36 of the beads 14 is refracted, transmitted through the opaque binder layer 16, and dispersed to viewers through a filter surface 18. The filter surface 18 defines a front side of the light filter 10 through which viewers can observe the light. Light 21 incident on the back surface 19 of the opaque binder layer 16 may reach viewers through a plurality of interstices 20 between the beads 14. One role of the opaque binder layer 16 is to reduce interstitial transmission of such light 21. Ambient light incident on the filter surface 18 may be re-dispersed back toward viewers. Such re-dispersed light 53 can significantly degrade image quality.

Figure 2:
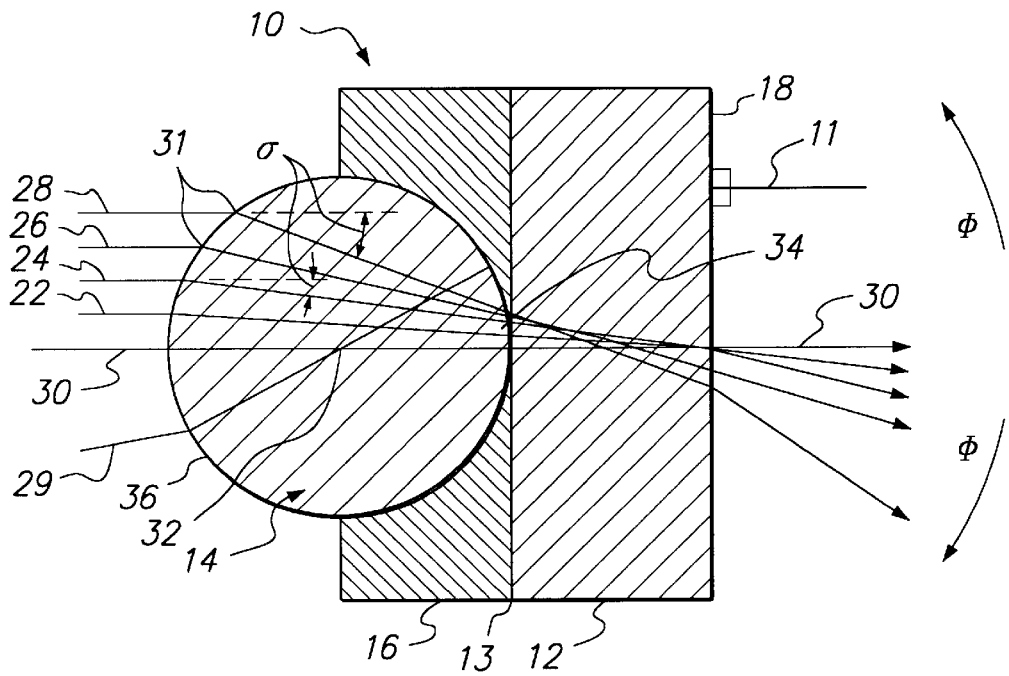
FIG. 2 is a diagram indicating the refraction of light rays by spherical beads in a conventional single-layer light filter.

Referring now to FIG. 2, there is shown a cross-section of the conventional single-layer light filter 10 illustrating trajectories of light rays 22, 24, 26, 28 incident on the back surface 36 of a bead 14 at various distances from an optic axis 30. The optic axis 30 is defined to extend from a center 32 of the bead 14 and to be substantially perpendicular to the filter surface 18 of the light filter 10. Prior to striking the back surface 36 of the bead 14, the light rays 22, 24, 26, 28 are collimated parallel with the optic axis 30. Each light ray 22, 24, 26, 28 is refracted by the bead 14 toward the optic axis 30 by an angle σ which increases with the distance between the point of incidence 31 with the back surface 36 of the bead 14 and the optic axis 30, and also increases with the index of refraction of the beads 14. The refracted light rays 22, 24, 26, 28 are directed through a transmission area 34 which includes a point of contact between the bead 14 and the support surface 13 of the transparent support material 12, as well as a surrounding area in which intervening opaque binder layer 16 is too thin to substantially attenuate the refracted light rays 22, 24, 26, 28. FIG. 2 further illustrates a light ray 29 not collimated with the optic axis 30 which strikes the back surface 36 of the bead 14, is refracted by the bead 14 into the opaque binder layer 16 outside the transmission area 34, and is then absorbed within this layer 16.

The refracted light rays 22, 24, 26, 28 diverge after passing through the transmission area 34 of the bead 14, dispersing such light over a range of angles Φ relative to a normal 11 to the filter surface 18. In the light filter 10, the beads 14 collectively disperse transmitted light at various angles relative to the normal 11. The relative intensity of such light as a function of angle with respect to the normal 11 defines the gain profile of the light filter 10. Light filters 10 having a high gain at Φ equal to zero degrees typically transmit image light in a narrow angular distribution about the normal 11, whereas light filters 10 having a low gain at Φ equal to zero degrees typically transmit image light in broad distributions about the normal 11. The optimum gain for the light filter 10 typically depends on the intended application for the light filter 10, and often is selected in part by choosing component beads 14 having an appropriate index of refraction.

Figure 3:
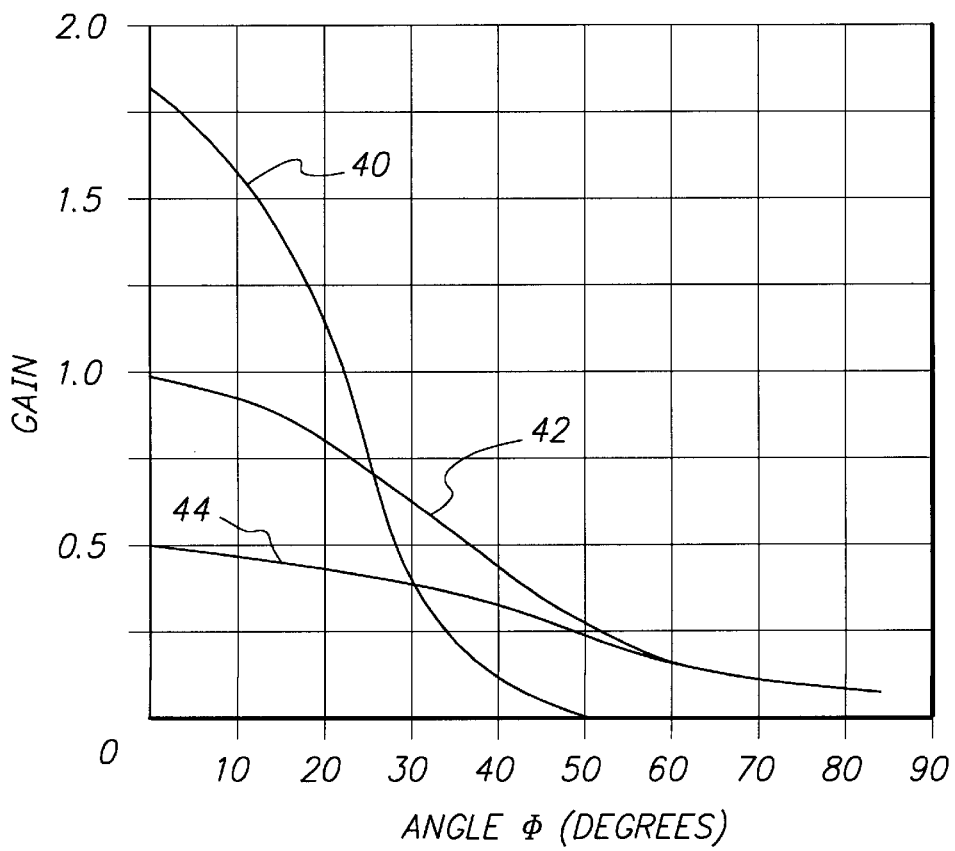
FIG. 3 is a graph of the gain profiles for three single-layer light filters having glass beads with indices of refraction of approximately 1.5, 1.7, and 1.9, respectively.

Referring now also to FIG. 3 there are illustrated gain profiles 40, 42, 44 characterizing three conventional single-layer light filters 10 having beads 14 with indices of refraction of approximately 1.5, 1.7, and 1.9, respectively. The gain for Φ equal to about zero degrees is greatest for beads 14 having a low index of refraction, and decreases with increasing index of refraction of the beads 14. The greater refractive power of high index beads 14 refracts the transmitted rays 22, 24, 26, 28 more sharply than low index beads 14. These rays 22, 24, 26, 28 subsequently diverge over a wider range of angles from the normal 11, and are less concentrated along the normal 11.

The degree of gain control available with conventional single-layer light filters 10 is constrained. For instance, reducing the index of refraction of the beads 14 to increase the gain around the normal 11 necessarily reduces the refracting power of the beads 14. As a result, the amount of light focused into transmission area 34 and subsequently transmitted to filter surface 18 is reduced, thus reducing the total intensity of transmitted image light. Also, with single-layer light filters 10, a greater percentage of image light is reflected off back surfaces 36 of the beads 14 and lost, relative to light filters of the present invention.

Light filters are also characterized by their resolution and ambient light rejection, with high measures of these characteristics generally being desirable. The resolution of conventional single-layer light filters 10 is determined by the size of the beads 14 and the packing density of the beads 14 on the support surface 13, which together determine the density of the transmission areas 34 on the support surface 13. This property can generally be maximized by constructing such light filters 10 using the smallest diameter beads 14 available. The size of the beads 14 selected may be dictated by variations in the quality and tolerances of available beads 14.

Ambient light rejection measures how well ambient light incident on the front of a light filter is absorbed or transmitted relative to the amount re-dispersed back to the viewer. Sources of such re-dispersed light include reflection at the interfaces between: a) air in front of the light filter 10 and the filter surface 18 thereof; b) the opaque binder layer 16 and the support surface 13; c) the beads 14 and the opaque binder layer 16; and d) the beads 14 and air at the back surfaces 36 of the beads 14. Re-dispersed light can significantly degrade image quality. For example, re-dispersed light can reduce image contrast.

It is difficult to maximize ambient light rejection in conventional single-layer light filters 10 without compromising other optical properties. Matching the index of refraction of the transparent support material 12 with that of the opaque binder layer 16, and making the opaque binder layer 16 highly opaque, help to reduce re-dispersion of ambient light. However, increasing the opacity of the opaque binder layer 16 also decreases the amount of image light transmitted through the transmission areas 34, and thus reduces the total transmittance of the conventional light filter 10.

In some conventional single-layer light filters 10, a portion of image light projected onto the back surface 19 of the opaque binder layer 16 is transmitted through interstices 20 between the beads 14, and then exits the light filter 10 at the filter surface 18. Such interstitially transmitted light typically is not dispersed by the beads 14, and thus interferes with the properly dispersed light rays. Such interstitially transmitted light can be reduced by increasing the opacity of the binder layer 16, which unfortunately also reduces the transmittance of these light filters 10.

The present invention comprises single-layer and multi-layer light filters including additional structure relative to the conventional single-layer light filter 10 for providing improved optical properties. For purposes of describing the present invention, a transmission area 34 is defined as that area directly in front of a bead 14 in which any opaque material is too thin to absorb substantially image light refracted by the bead 14.

Referring now to FIG. 4, there is shown an embodiment of a multi-layer light filter 50 of the present invention which provides additional gain control beyond that provided by the index of refraction of component beads 14. The light filter 50 comprises a transparent support medium 12, having a support surface 13 and a filter surface 18, and an opaque binder layer 16 in which beads 14 having a selected index of refraction are embedded. In addition, an interstitial layer 62 of transparent resin is deposited in a plurality of depressions 64 created by the back surfaces 36 of the beads 14 protruding from the back surface 19 of the opaque binder layer 16. The index of refraction of the interstitial layer 62 can be greater, less than, or substantially equal to that of the beads 14, depending on the desired gain of the light filter 50.

The interstitial layer 62 increases the effective radius of curvature of the back surfaces 36 of the beads 14, thus reducing their refractive power. For comparison, refracted rays 28' for untreated beads 14' are shown at the top of FIG. 4. The actual refractive power of the beads 14 will vary with the degree to which the depressions 64 are filled. This dependence provides a means to adjust the gain of the light filter 50 in addition to changing the index of refraction of the beads 14. It also serves to increase the efficiency of light transmission through the beads 14 by decreasing reflection of light off the back surfaces 36 of the beads 14.

As the depth of the resin layer 62 in the depressions 64 is increased, the effective radius of curvature of the back surfaces 36 of the beads 14 approaches infinity, i.e. a planar surface. In this limit, the beads 14 are completely immersed in the interstitial layer 62. Where the interstitial layer 62 and the beads 14 have different indices of refraction, refraction will occur at the back surfaces 36 of the beads 14, providing another means for controlling the gain of the multi-layer light filter 50 beyond varying the index of refraction of the beads 14 relative to air or other media behind the light filter 50.

Referring now to FIG. 5, there is shown an alternative embodiment of a multi-layer light filter 60 of the present invention having gain control in addition to that provided by the index of refraction of the beads 14. The light filter 60 has an array of beads 14 embedded in an opaque binder layer 16 which is affixed to a support material 12. In addition, a immersive layer 72 of transparent resin having an index of refraction different from that of beads 14 is added to the back surfaces 36 of the beads 14 and the back surface 19 of the opaque binder layer 16. Unlike interstitial layer 62 of light filter 50, the immersive layer 72 entirely immerses the back surfaces 36 of the beads 14 and presents a planar surface 74 to incident image light.

Light rays 28 from an image source (not shown) are incident normally on planar surface 74 where they undergo no refraction. However, at the interface 35 between the immersive layer 72 and the beads 14, the light rays 28 are refracted by an amount determined by the ratio of the indices of refraction of these media. Thus, refraction at the interface 35 and consequently the gain of the light filter 60 can be adjusted by varying the index of refraction of the immersive layer 72 as well as that of the beads 14. The light rays 28 are drawn for the case where the opaque binder layer 16 and support material 12 have about the same index of refraction which is slightly less than that of the beads 14. Independent adjustment of the indices of the opaque binder layer 16 and the support material 12 provides additional control over the gain of the light filter 60.

Figure 6:
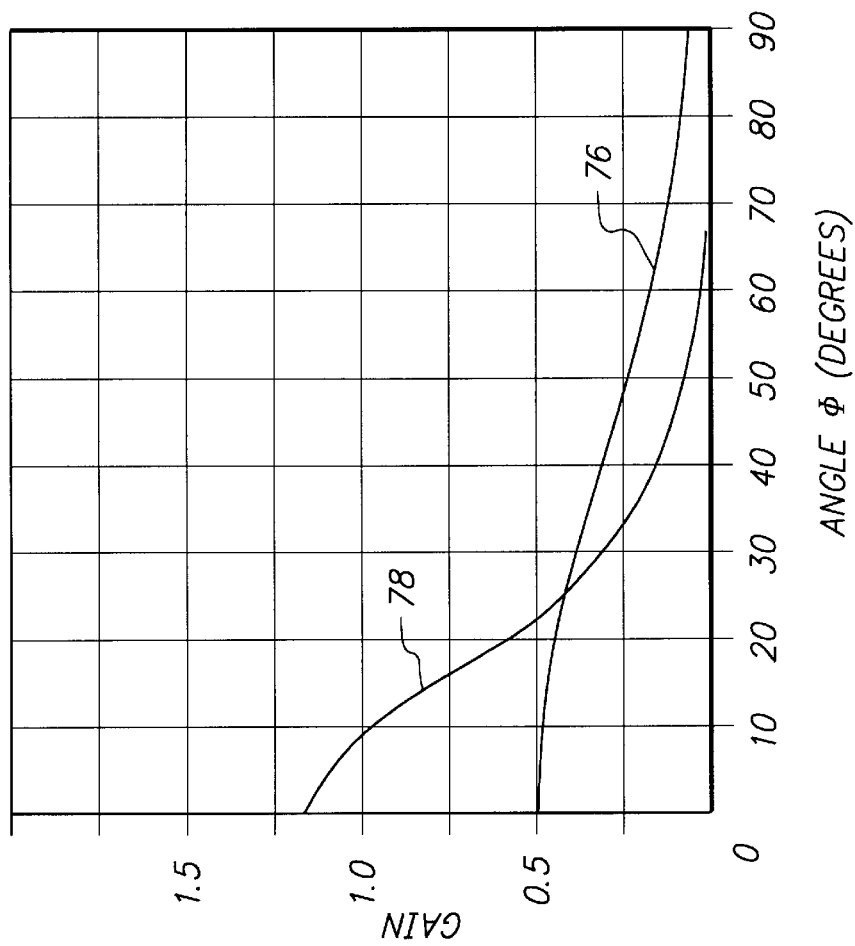
FIG. 6 is a graph of the gain profile versus angle from the normal to the viewing surface for a conventional single-layer light filter and for the multi-layer light filter illustrated in FIG. 5.

Referring now to FIG. 6, there are shown gain profiles 76, 78 for the conventional single-layer light filter 10, and for the multi-layer light filter 60, respectively, where each includes beads 14 having indices of refraction of about 1.9. The immersive layer 72 of light filter 60 has an index of refraction that is approximately 1.5. Due to the weaker refraction at the interface 35 between the back surfaces 36 of the beads 14 and the immersive layer 72 in light filter 60, image light is transmitted more nearly parallel to normal 11, giving the light filter 60 a higher gain (78) than the light filter 10. The immersive layer 72 of light filter 60 and interstitial layer 62 of light filter 50 provide more complete control of the gain in light filters 50, 60, respectively, than is possible with conventional single-layer light filters 10 because the gain of light filters 50, 60 can be controlled by adjusting the effective radius of the back surfaces 36 of the beads 14, the index of refraction of the beads 14, and indices of refraction of second layer materials 62, 72. Further, this additional control is achieved while also improving transmittance relative to conventional single-layer light filters 10. Other multi-layer light filters include optical layers which enhance the contrast and ambient light rejection provided by the opacity of the opaque binder layer 16.

Figure 7:
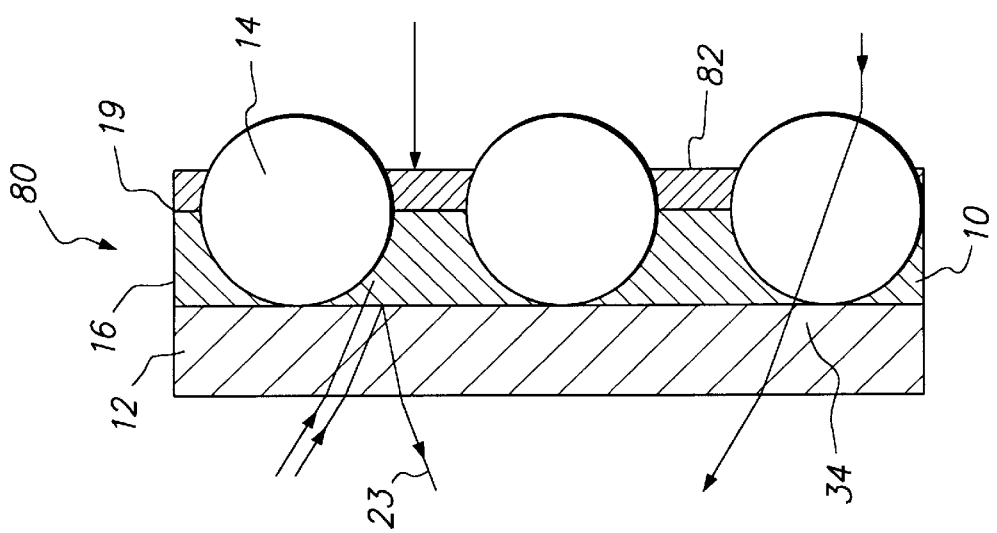
FIG. 7 is a diagram of another alternative embodiment of a multi-layer light filter of the present invention having a second opaque layer disposed on the back surface of an opaque binder layer for controlling interstitial transmission of image light.

Referring now to FIG. 7, there is shown another alternative embodiment of a multi-layer light filter 80 of the present invention including a second opaque layer 82 deposited on the back surface 19 of the opaque binder layer 16 and having an opacity selected to reduce the transmission of light through the interstices 20. The opacity of the opaque binder layer 16 is independently selected to reduce reflected light 23 without substantially reducing transmission of image light through transmission area 34. The opacity of the second opaque layer 82 can be increased to the eliminate light transmission through interstices 20 because transmission of light through transmission area 34 is substantially unaffected by the greater opacity of the second opaque layer 82.

One way to generate the second opaque layer 82 is to deposit carbon black or some other powdered pigment such as xerographic toner on the opaque binder layer 16 and heat the light filter 80 until the toner has diffused into the thermo plastic opaque binder layer 16. This provides a thin layer 82 at the back surface 19 of the opaque binder layer 16 having greater opacity than the opaque binder layer 16. The opacity of the second opaque layer 82 is selected to reduce transmission of light through the interstices 20 to acceptable levels.

Figure 8A:
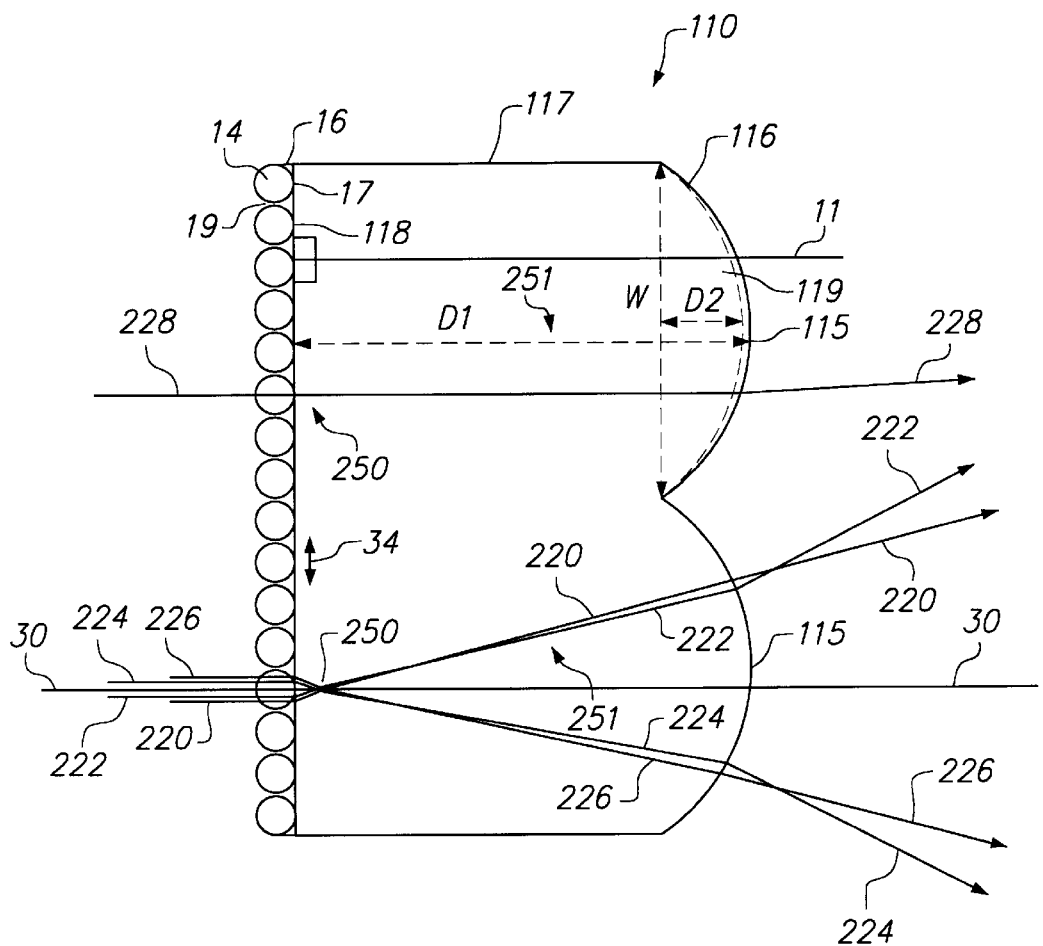
FIGS. 8A, B are cross-sectional and perspectival diagrams respectively of another alternative embodiment of a light filter of the present invention in which an additional layer of a light transmissive material having a plurality of parallel disposed columnar lenses is affixed to a front surface of an opaque binder layer to provide control over dispersion of image light.
Figure 8B:
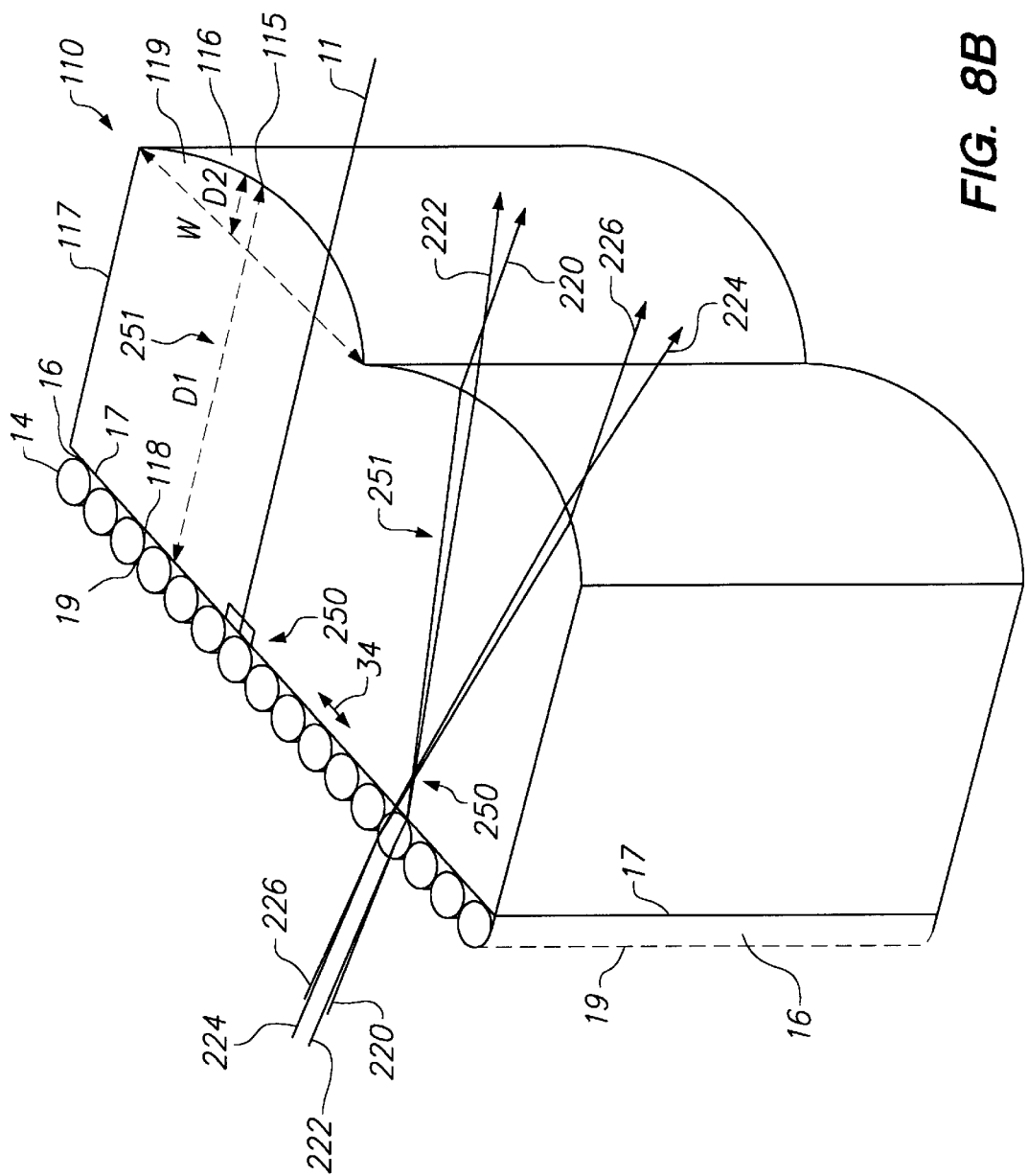
FIG. 8C is a cross-sectional diagram of another alternative embodiment of a light filter of the present invention in which an additional layer of a light transmissive material having a plurality of parallel disposed columnar lenses is affixed to a back surface of an opaque binder layer to provide control over dispersion of image light.

Referring now FIGS. 8A, B there are shown cross-sectional and perspectival diagrams respectively of another alternative embodiment of a light filter 110 of the present invention. The light filter 110 comprises a single-layer array of spherical light transmissive beads 14 structurally supported in an opaque binder layer 16 having a back surface 19 through which the beads 14 protrude to receive light 220, 222, 224, 226, 228 from an image source (not shown), and having a substantially flat front surface 17 that the beads 14 contact to allow transmission of the light 220, 222, 224, 226, 228 into a plurality of transmission areas 34 of the beads 14. The light filter 110 further comprises a layer of light transmissive material 117 having a contact surface 118 affixed to the front surface 17 of the opaque binder layer 16 to receive the light 220, 222, 224, 226, 228 from the transmission areas 34, and having an exposed surface 116 curved over an area covering a plurality of the beads 14. The light 220, 222, 224, 226, 228 is transmitted through the layer of light transmissive material 117 which acts as a plurality of lenses and hence controls dispersion of the light 220, 222, 224, 226, 228.

Prior to striking the back surface 36 of the bead 14, the light rays 220, 222 are shown in very close proximity with one another. Refraction of these light rays 220, 222 by the bead 14 and layer of light transmissive material 117 causes the light rays 220, 222 to cross within layer 117 at a focal point 250 of the bead 14. These rays are then further refracted at the exposed surface 116 of layer 117 and again cross or skew across each other in front of the light filter 110. The total dispersive effect of the light filter 110 is a convolution of such refractions, resulting in additional dispersion of light. The light rays 224, 226 are similarly shown in very close proximity with one another, and cross each other within the layer 117 at the focal point 250 of the bead 14, and again cross or skew across each other in front of the light filter 110.

The index of refraction of the beads 14 is preferably selected over a range of ratios from about 1:1 to about 1.3:1 relative to the indices of refraction of the opaque binder layer 16 and the layer of light transmissive material 117. These ratios adjust dispersion of the light 220, 222, 224, 226, 228 over a range of angles from about ten degrees to about fifty degrees relative to a normal 11 to the front surface 17 of the opaque binder layer 16.

The layer of light transmissive material 117 can magnify the appearance of the beads 14 if the layer 117 is sufficiently thin. This property depends on the relative location of various focal points 250, 251 of component materials. In particular, the beads 14 each have a focal point 250 in front of the opaque binder layer 16 where image light such as light rays 220, 222, 224, 226, 228 is focused. The exposed surface 116 of the layer of light transmissive material 117 similarly has focal points 251 where light collimated with the optic axes 30 of the beads 14 and projected from in front of the light filter 110 onto the exposed surface 116 would be focused. The appearance of the beads 14 typically will be magnified if the focal points 250 of the beads 14 are near or in front of these focal points 251 of the layer of light transmissive material 117.

For most applications of the present invention, it is undesirable to magnify the appearance of the beads 14. For such applications, the layer of light transmissive material 117 is preferably sufficiently thick that focal points 251 of the layer of light transmissive material 117 are well in front of the focal points 250 of the beads 14. Such thickness prevents the beads 14 from appearing magnified by this layer 117, and thus improves image resolution by preserving the appearance of fine-grain structure in the light filter 110. Where spherical beads 14 of radius about 25 microns are included in the light filter 110, the layer of light transmissive material 117 is preferably about 3000 microns in total depth D1 with each curved portion 119 defined by the exposed surface 116 being about 500 microns in width W, about 250 microns in depth D2, and covering approximately ten of the beads 14.

While the exposed surfaces 116 illustrated in FIGS. 8A, B each define columnar lenses with the illustrated circular exterior shape in cross-section, other shapes for the cross-section are also possible. The layer of light transmissive material 117 can be selectively shaped so that the exposed surface 116 is either flatter or more elongated than illustrated. Flatter exposed surfaces 116 tend to concentrate image light more toward apexes 115 of the exposed surfaces 116, and conversely, more elongated exposed surfaces 116 tend to disperse light more away from the apexes 115 of the exposed surfaces 116.

The additional layer of light transmissive material 117 is particularly useful in viewing screen applications such as television and home theater displays where greater dispersion of light typically is needed horizontally than vertically. For example, the additional layer of light transmissive material 117 illustrated in FIG. 8A includes a plurality of columnar convex lenses disposed parallel to one another and parallel to the front surface 17 of the opaque binder layer 16, and can achieve a wider horizontal dispersion of light than vertical dispersion of light.

Figure 8C:
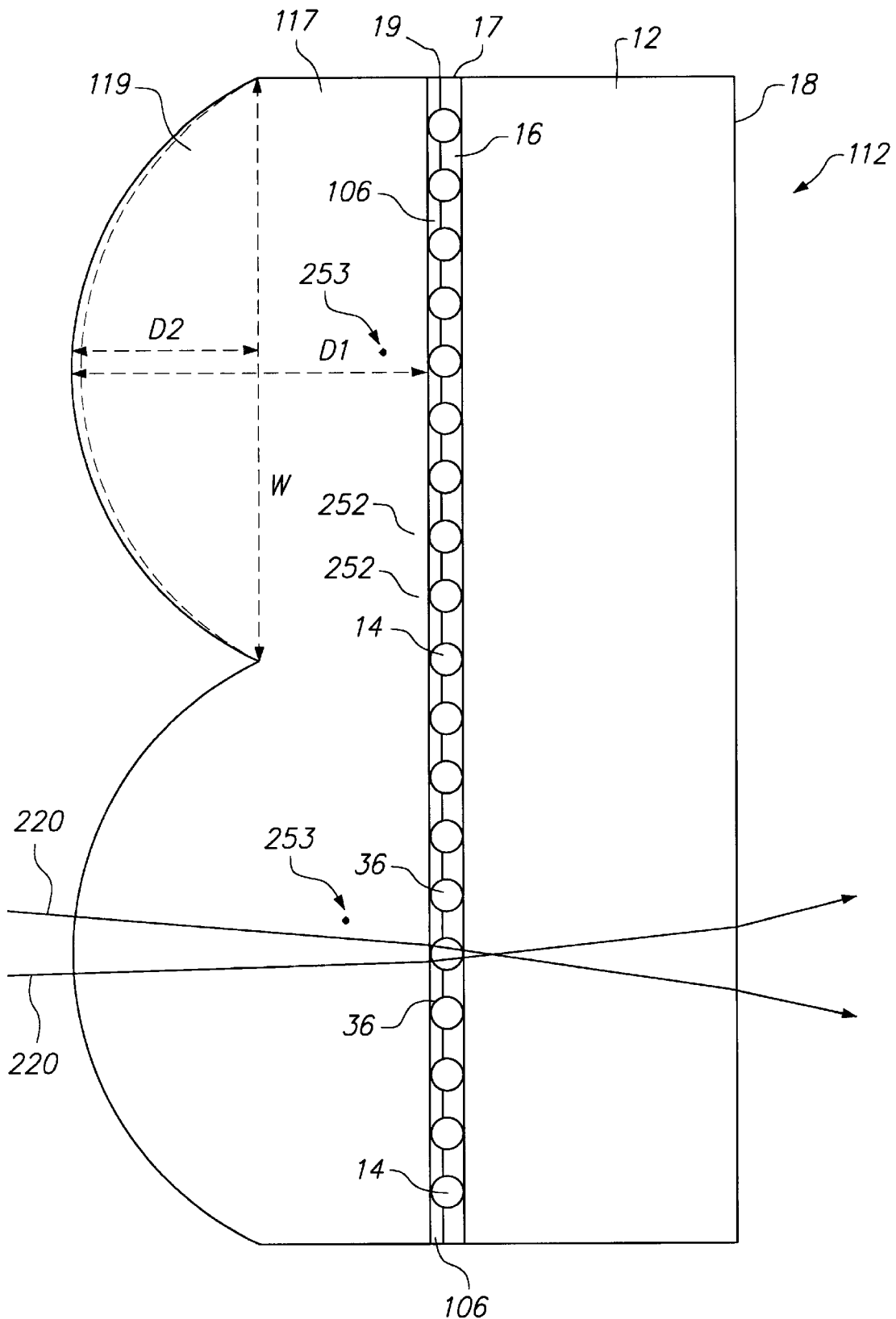

Referring now also to FIG. 8C, there is shown a cross-sectional diagram of another alternative embodiment of a light filter 112 of the present invention wherein the layer of light transmissive material 117 is affixed to the back surface 19 of the opaque binder layer 16 and the back surfaces 36 of the beads 14, for example, by using a layer of transparent adhesive 106. Such a layer 117 can also be affixed to both the front and back surfaces of a light filter (not shown). Additional layers of light transmissive material and opaque binder can be added to the light filters 110, 112 of FIGS. 8A, B, C as in light filters 50, 60, 80 for additional functionality. The layer of light transmissive material 117 provides additional control over dispersion of light 220 from an image source (not shown), such as increasing horizontal or vertical dispersion of such light 220.

As with light filter 110, the layer of light transmissive material 117 of light filter 112 can magnify the appearance of the beads 14 if the layer 117 is sufficiently thin. This property depends on the relative location of various focal points 252, 253 of component materials. In particular, the beads 14 each have a focal point 252 behind the opaque binder layer 16 where a small portion of light collimated with the optic axes 30 of the beads 14 and projected from in front of the light filter 110 onto the beads 14 would be focused. The layer of light transmissive material 117 similarly has focal points 253 where image light such as light rays 220 is focused. The appearance of the beads 14 typically will be magnified if the focal points 252 of the beads 14 are near or behind these focal points 253 of the layer of light transmissive material 117.

Again, for most applications of the present invention, it is undesirable to magnify the appearance of the beads 14. For such applications, the layer of light transmissive material 117 is preferably sufficiently thick that focal points 253 of the layer of light transmissive material 117 are well behind the focal points 252 of the beads 14. Such thickness prevents the beads 14 from appearing magnified by this layer 117, and thus improves image contrast by preserving the appearance of fine-grain structure in the light filter 110. As with light filter 110, where spherical beads 14 of radius about 25 microns are included in the light filter 112, the layer of light transmissive material 117 is preferably about 3000 microns in total depth D1 with each curved portion 119 defined by the exposed surface 116 being about 500 microns in width W, about 250 microns in depth D2, and covering approximately ten of the beads 14.

One process of the present invention of making light filters 110, 112 is to secure a sheet of light transmissive material 117 that includes a desired lens pattern to the front surface 17 of opaque binder layer 16 or the back surface 19 of the opaque binder layer 16 and the back surfaces 36 of the beads 14, or both, using a transparent pressure sensitive adhesive. The sheet 117 can be made by embossing a flat layer of polycarbonate film with a suitable mold. Such a sheet can also be affixed to the light filters 10, 50, 60, 80 in the same manner.

Figure 9A:
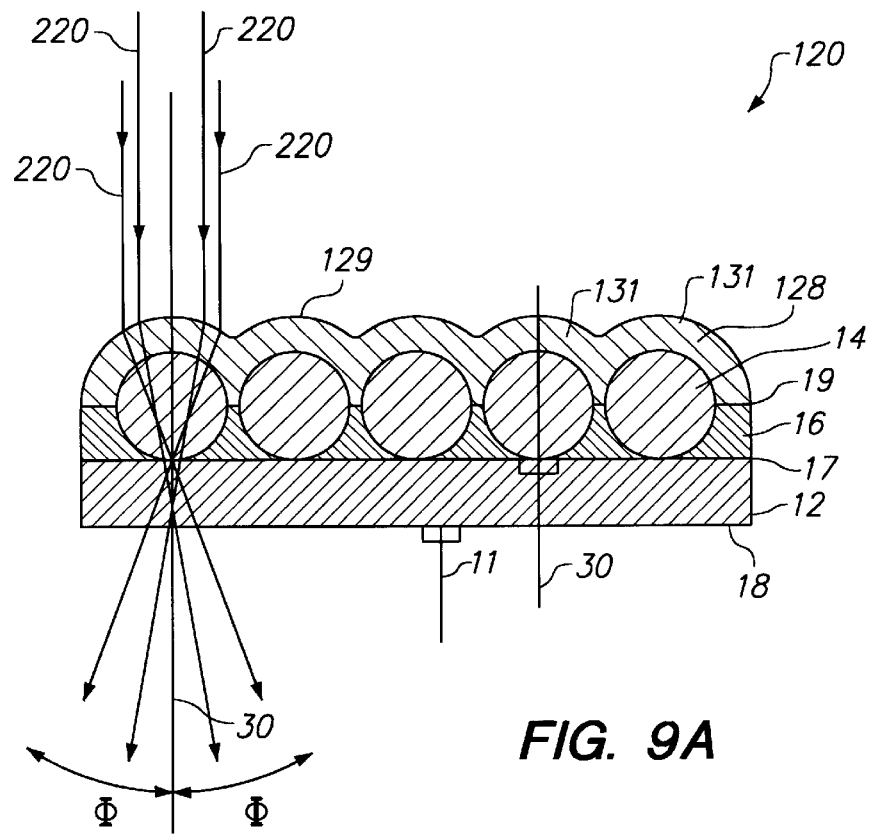
FIG. 9A is a diagram of another alternative embodiment of a light filter of the present invention in which a conformal layer of light transmissive material is disposed on the back surfaces of light transmissive beads to a substantially uniform thickness, such conformal layer defining a plurality of lenses for controlling dispersion of image light and increasing the transmittance of the light filter.

Referring now to FIG. 9A there is shown another alternative embodiment of a light filter 120 of the present invention comprising a single-layer array of light transmissive beads 14 structurally supported in an opaque binder layer 16 having a back surface 19 through which the beads 14 protrude to receive light 220 from an image source (not shown), and having a substantially flat front surface 17 that the beads 14 contact to allow transmission of the light 220 through a plurality of transmission areas 34 in front of the beads 14, for viewing. The beads 14 each have a radius about equal to a selected value R. The light filter 120 can include the transparent support material 12 as in light filter 10 for improving the sturdiness of the light filter 120, with the support surface 13 being affixed to the front surface 17 of the opaque binder layer 16, and with the filter surface 18 being oriented toward the viewer (not shown). The light filter 120 also includes an additional conformal layer of light transmissive material 128 disposed on the back surfaces 36 of the beads 14 to a substantially uniform thickness between about 0.5R and 1.0R, where such thickness is measured normally to the back surfaces 36 of the beads 14. This conformal layer 128 can also cover the back surface 19 of an opaque binder layer 16.

The conformal layer 128 defines a plurality of lenses 131 for controlling dispersion of light and increasing the transmittance of the light filter 120. Each such lens 131 is disposed on the back surface 36 of a corresponding one of the beads 14 and has a substantially spherical back surface 129 with a radius of curvature about 1.5 to 2 times that the bead 14.

The conformal layer 128 supplies a preliminary stage of convergence of light 220 from the image source (not shown) into the beads 14. This allows a greater portion of this light to enter into the beads 14 than in conventional single-layer light filters 10. Further, such light 220 so converged is incident on the back surfaces 36 of the beads 14 at angles that allow a greater percentage of the light 220 to enter the beads 14 and propagate into the transmission areas 34 of the beads 14. At any given point on the back surface 36 of a bead 16, an ideal angle can be defined as that angle at which light striking the point would be refracted by the bead 14 onto a center of the transmission area 34 of the bead 14.

These properties of the present invention allow a greater percentage of the light 220 striking the back surfaces 36 of the beads 14 to be transmitted through the filter surface 18 than is typically feasible with conventional single-layer light filters 10. These properties greatly increase the transmittance of the light filter 120. Such embodiments of the present invention have been shown to exhibit a transmittance of 50 percent, and are believed to have an ideal transmittance of up to 65 percent. In conventional single-layer light filters 10, a higher percentage of such image light typically would: a) strike the interstices 20 between the beads 14, b) be reflected by portions of the back surfaces 36 of the beads 14 more than about 0.8 R from the optic axis 30, c) be retro-reflected by the beads 14 back toward the image source (not shown), and d) be transmitted through transmission areas 34 near edges thereof, thus causing attenuation of such light.

The conformal layer 128 also reduces the ratio ($n_{beads}/n_{medium}$) of the index of refraction $n_{beads}$ of the beads 14 and the index of refraction $n_{medium}$ of the medium behind the beads 14. In the conventional single-layer light filter 10, such medium typically comprises surrounding air in which the light filter 10 is used. For the conventional single-layer light filter 10, this ratio ($n_{beads}/n_{medium}$) thus equals ($n_{beads}/n_{air}$), where $n_{air}$ is the index of refraction of air and typically is about equal to 1. Thus, the ratio ($n_{beads}/n_{air}$) is substantially equal to the index of refraction $n_{beads}$ of the component beads 14. However, in light filter 120, the medium behind the beads 14 comprises the light transmissive material of the conformal layer 128, which typically has an index of refraction $n_{conformal\ layer}$ of about 1.5. For light filter 120, said ratio ($n_{beads}/n_{medium}$) thus equals ($n_{beads}/n_{conformal\ layer}$), which typically is significantly lower than $n_{beads}$, thus reducing reflection of the light 220 off the back surfaces 36 of the beads 14, and increasing the transmittance of the light filter 120. The gain of light filter 120 can further be controlled by the degree of curvature of the back surface 129 of the conformal layer 128.

These properties of the present invention beneficially prevent excessive loss of image light intensity caused by reflection in conventional single-layer light filters 10. Adjustment of the dispersion of light through various angles Φ relative to normal 11 to the filter surface 18 in light filter 120 can also be achieved by appropriately selecting the index of refraction of the light transmissive material of the conformal layer 128. Heat and pressure can be applied to selectively shape the back surface 129 of the conformal layer 128 for improved operation of the light filter 120. For example, the transmittance of the light filter 120 can be increased by reducing the radius of curvature of the back surface 129 of this layer 128, as next discussed.

Figure 9B:
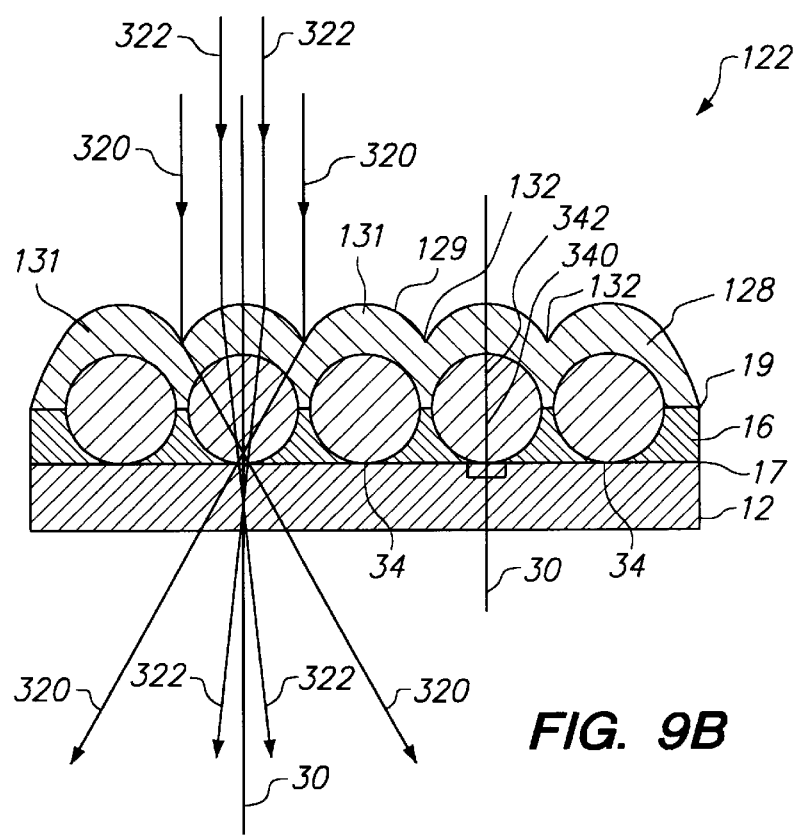
FIG. 9B is a diagram of another alternative embodiment of a light filter of the present invention in which a conformal layer of light transmissive material is disposed on the back surfaces of both a plurality of light transmissive beads and an opaque binder layer, the conformal layer defining a lens behind each bead, with these lenses having centers of curvature behind centers of curvature of the beads for controlling dispersion of image light and increasing the transmittance of the light filter.

Referring now to FIG. 9B there is shown another alternative embodiment of a light filter 122 of the present invention, comprising a single-layer array of light transmissive beads 14 structurally supported in an opaque binder layer 16 having a back surface 19 through which the beads 14 protrude to receive light 320, 322 from an image source (not shown), and having a substantially flat front surface 17 that the beads 14 contact to allow transmission of the light 320, 322 through a plurality of transmission areas 34 of the beads 14, for viewing. The light filter 122 also includes an additional conformal layer 128 of light transmissive material disposed on the back surfaces 36 of the beads 14 and the back surface 19 of an opaque binder layer 16. The additional conformal layer 128 defines a lens 131 behind each bead 14. The lenses 131 have centers of curvature 342 behind centers of curvature 340 of the beads 14, and the layer 128 has a non-uniform thickness as measured normally to the back surfaces 36 of the beads 14. Further, in light filter 122, the back surface 129 of this layer 128 has a smaller radius of curvature than in light filter 120, and can be either larger, the same size as, or smaller than the radius of curvature of the beads 14.

The conformal layer 128 supplies a preliminary stage of convergence of the light 320, 322 into the beads 14, this stage of convergence provides at least the benefits of light filter 120. Further, it is believed that positioning the centers of curvature 342 of the back surface 129 of this layer 128 behind the centers of curvature 340 of the beads 14 increases convergence of such light 320, 322 into the beads 14, and converges such light into the beads 14 nearer to the ideal angles for refraction of such light 320, 322 through transmission areas 34 in front of the beads 14. Similarly, it is believed that reducing the radius of curvature of the back surface 129 of this layer 128, increases such convergence and converges such light nearer to said ideal angles. These properties are believed to provide light filters with an ideal transmittance of up to 80 percent.

The light filter 122 can include the transparent support material 12 as illustrated for improving the sturdiness of the light filter 120, with the support surface 13 being affixed to the front surface 17 of the opaque binder layer 16, and with the filter surface 18 being oriented toward the viewer (not shown). Such support material 12 can be omitted where such sturdiness is not required. Similarly, the light filters 120, 122 can include a plurality of opaque binder layers, and can include the layer of light transmissive material 102 as defined above with respect to light filters 110, 112.

Materials selection for light filters 120, 122 is similar to that of light filters 10, 60, 110, 112. The index of refraction of the beads 14 is preferably selected over a range of ratios from about 1:1 to about 1.3:1 relative to the indices of refraction of the opaque binder layer 16 and the conformal layer 128 for increasing transmission of image light into the beads 14. Suitable materials for the conformal layer 128 include polyvinyl buterol (PVB) and thermoplastic polyurethane (TBU). For example, a conformal layer 128 with an index of refraction of about 1.5 can be fabricated from either of these two materials, and the beads 14 selected with a common index of refraction in a range between about 1.5 and 2.3. The conformal layer 128 beneficially reduces an increase in index of refraction encountered by the light 220, 320, 322 as it encounters the back surface 36 of the beads 14. This in effect increases the transmittance of the beads 14. Gain control can be provided, for example, by selectively shaping the back surface 129 of the conformal layer 128 in the manner described above.

A plurality of opaque binder layers and an opaque binder layer of non-uniform transmittance can also be included in light filter 120 by incorporating the conformal layer 128 on the back surfaces 36 of the beads 14 and the back surface of the back most of the opaque binder layers. The layer of light transmissive material 117 of light filter 110 can also be affixed to the filter surface 18, or alternatively to the front surface 17 of the opaque binder layer 16 where the transparent support material 12 has been omitted.

A first process of the present invention for making light filter 120 uses an opaque binder such as thermoplastic resin uniformly mixed with a colorant such as carbon black, a plurality of light transmissive beads 14 each of radius R, a layer of transparent TPU having a uniform thickness selected between about 0.8R and 1.5R, and a removable support surface. The opaque binder is selected to have a viscous unset state and substantially rigid set state, and the TPU is selected to have a deformable semi-viscous unset state and substantially rigid set state. The process comprises the steps of depositing a layer of the opaque binder in the unset state on the removable support surface to a thickness of about 0.3 to 0.8 R, arranging the plurality of light transmissive beads 14 in a single layer array on the layer of the opaque binder, penetrating the plurality of light transmissive beads 14 into the layer of opaque binder to the support surface, placing the opaque binder into the set state for supporting the light transmissive beads 14 in position, depositing the layer of light transmissive material in the set state on protruding back surfaces 36 of the beads 14, placing the layer of light transmissive material in the deformable semi-viscous unset state, applying pressure to the layer of light transmissive material to conform the layer to the shapes of protruding portions of the beads 14 and laminate said layer to the beads 14 and the opaque binder, and placing the layer light transmissive material into the set state in a conventional manner for binding said layer to the beads 14. Depositing the opaque binder to the stated thickness assures that portions of the back surfaces 36 of the beads 14 will suitably protrude from behind the opaque binder. The deformable semi-viscous state of the TPU beneficially allows the layer of TPU to conform to the shapes of these protruding portions of the beads 14 and retain a substantial uniformity of thickness directly behind each bead 14.

One process of the present invention for making the light filter 122 comprises the steps of the above first process for making light filter 120, and further comprises applying heat and or pressure to the layer of TPU to selectively shape a back surface thereof. The back surface can be shaped to define lenses 131 with centers of curvature behind centers of curvature of the beads 14. Radii of curvature of these lenses 131 can also be adjusted in this manner. This process can result in a non-uniform thickness in the layer 128 measured normally to the back surfaces 36 of the beads 14. An alternative process of the present invention for making the light filter 122 comprises the steps of the above first process for making light filter 120, and further comprises depositing a small quantity of light transmissive material centrally on the back surface 36 of each bead 14 prior to depositing the layer of light transmissive material in the set state on protruding back surfaces 36 of the beads 14.

A second and alternative process of the present invention for making light filters 120 uses a layer of transparent TPU having a uniform thickness selected between about 0.8R and 1.5R and a light filter 10, 80 or light filter 110 of the present invention having beads 14 that protrude through a back most binder layer. The process comprises disposing the layer of TPU on the back surfaces 36 of the beads 14 of the light filter 10, 80, 110, 112 heating the light filter 10, 80, 110, 112 and the layer of TPU to place the layer of TPU in the deformable semi-viscous unset state, applying pressure to the layer of TPU to conform the layer to the shapes of protruding portions of the beads 14 and laminate said layer to the beads 14 and the opaque binder, and curing the layer of TPU into a substantially rigid set state by cooling in a conventional manner.

This second and alternative process for making light filter 120 can also be modified in accordance with the present invention to make light filter 122. For example, heat and pressure can be applied to the layer of TPU as described above to selectively shape a back surface thereof. Alternatively, a small quantity of light transmissive material centrally on the back surface 36 of each bead 14 prior to disposing the layer of TPU on the back surfaces 36 of the beads 14.

Figure 10:
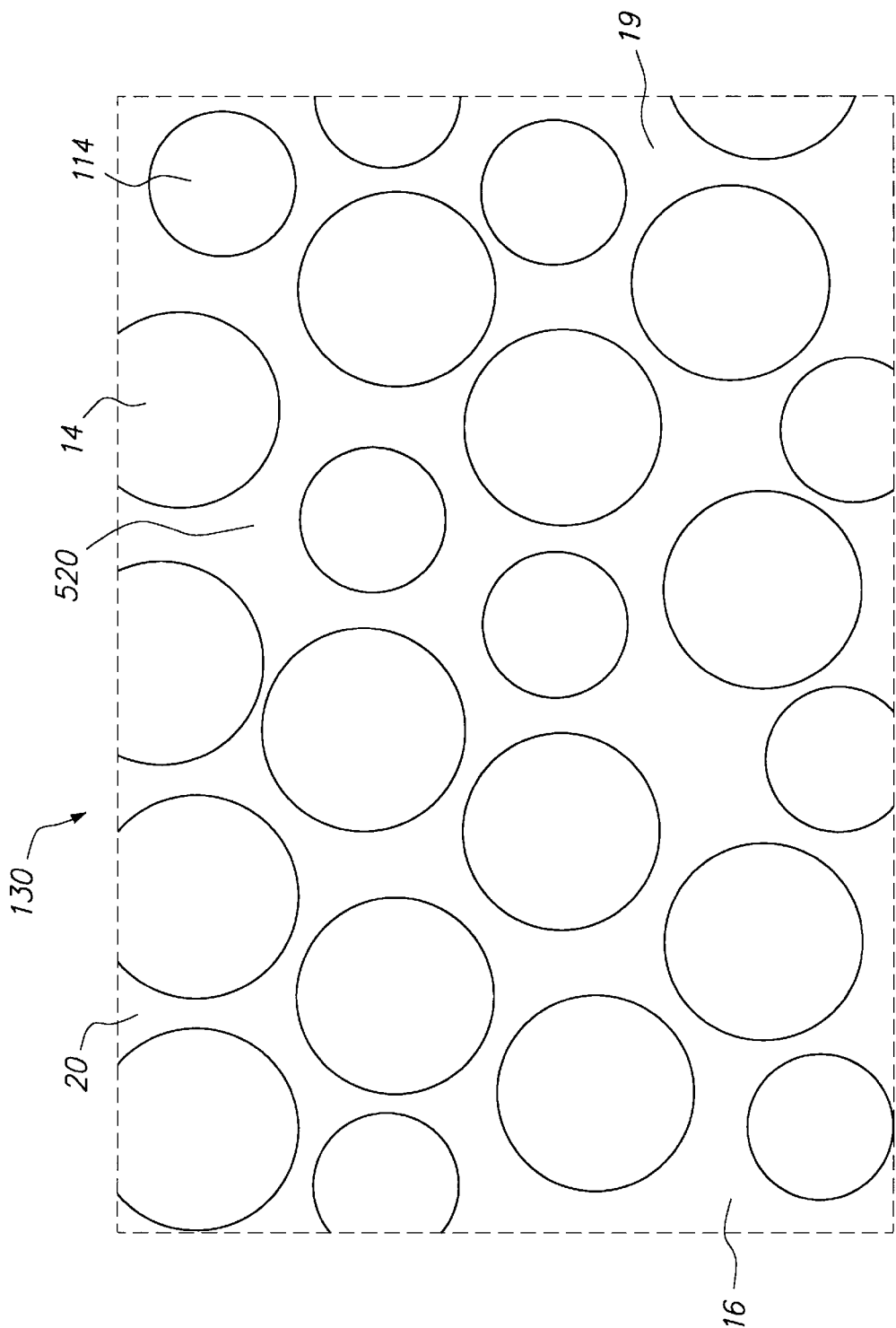
FIG. 10 is a diagram of another alternative embodiment of a light filter of the present invention which comprises a first plurality of light transmissive beads arranged in an irregularly spaced array and a second plurality of smaller beads positioned in interstitial gaps between the beads of the irregularly spaced array.

Referring now to FIG. 10, there is shown a diagram of another alternative embodiment of a light filter 130 of the present invention comprising a first plurality of light transmissive beads 14 supported in an irregularly spaced array in an opaque binder layer 16. The opaque binder layer 16 has a back surface 19 through which the beads 14 protrude to receive image light, and has a front surface that the beads 14 contact to allow transmission of such image light through the opaque binder layer 16, for viewing.

Figure 11:
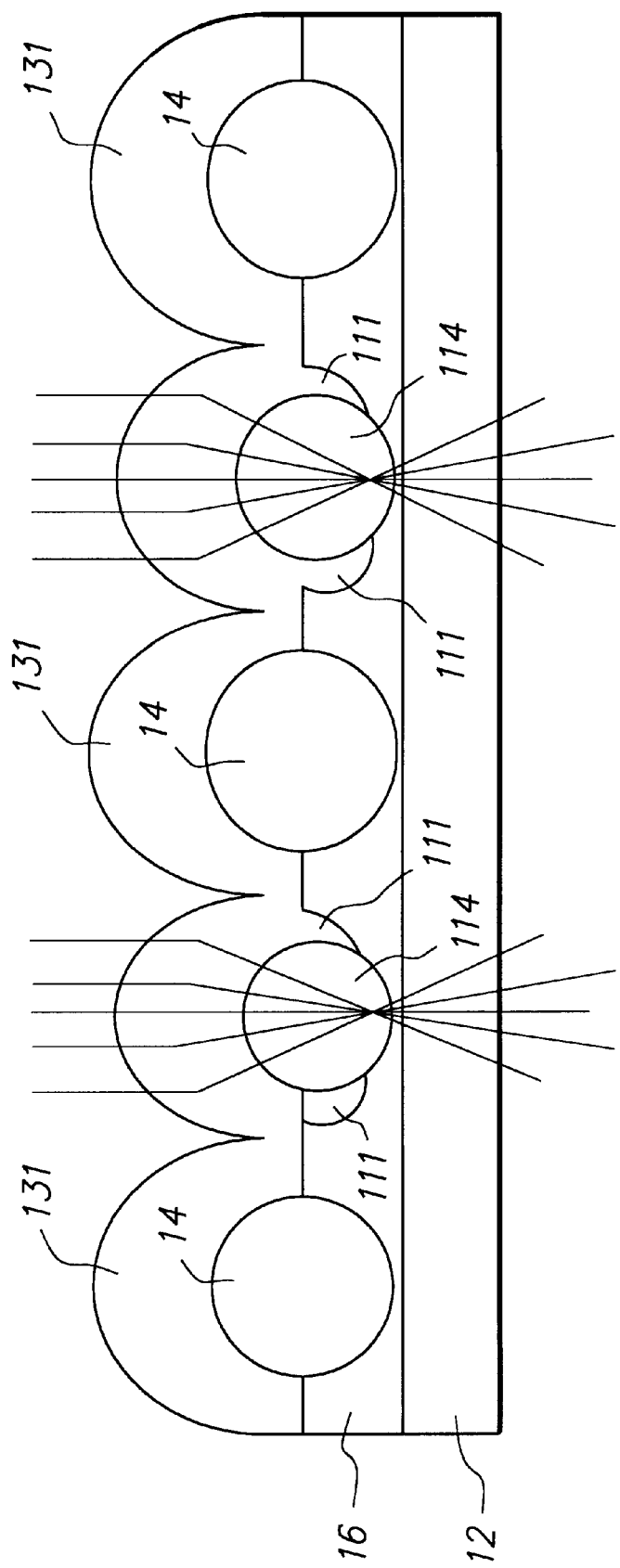
FIG. 11 is a cross-sectional diagram of the alternative embodiment of the light filter of the present invention which illustrates the arrangement of the first plurality of light transmissive beads and the second plurality of smaller beads.

Light filter 130 further comprises a second plurality of smaller beads 114 positioned in interstitial gaps 520 between the beads 14 of the irregularly spaced array. The interstitial gaps 520 comprise enlarged interstices 20 between the beads 14, with such enlargement being a result of irregular spacing between the beads 14 of the array. The smaller beads 114 are supported in position by the opaque binder layer 16, and preferably protrude through the back surface 19 of the layer 16 to receive image light, and contact the front surface of said layer 16 to allow transmission of the received image light through the layer 16, for viewing. The smaller beads 114 preferably have about the same index of refraction as the other beads 14, and about the same general shape but preferably about two-thirds the size of the other beads 14. Thus, where spherical beads 14 each having a substantially equal radius R are included, the beads 114 are also preferably spherical of radius about two-thirds R. These relative sizes help to increase protrusion of the smaller beads 114 through the back surface 19 of the opaque binder layer 16. Further, the opaque binder layer 16 preferably becomes thinner in a small annular region around each of the smaller beads 114 to increase protrusion of these smaller beads 114 through said back surface 19. Such a thinner annular region around each of the smaller beads 114 can be formed, for example, as a meniscus 111 between the smaller beads 114 and the opaque binder layer 16. FIG. 11 illustrates the formation of this meniscus 111 around the smaller beads 114. As shown, the opaque binder layer 16 preferably becomes thinner in a small annular region around each of the smaller beads 114 to increase protrusion of these smaller beads 114 through said back surface 19.

Referring once again to FIG. 10, such interstitial gaps 520 typically are present in any physical embodiment of a refractive light filter due to imperfections and tolerances of manufacturing process for the light filter, and similarly, due to imperfections and tolerances of component materials, such as size non-uniformity of the component beads 14. Usually, such gaps 520 occur on a somewhat random basis, but can appear to occur quasi-periodically. Such gaps 520 usually give a light filter a grainy appearance due to non-uniform shaping of the gaps 520, the appearance that such gaps 520 occur quasi-periodically, and also due to a loss in transmittance directly in front of the gaps 520.

The smaller beads 114 significantly reduce such problems in light filter 130. The smaller beads 114 partially fill the gaps 520 and thus tend to obscure both their presence and their shapes. Further, the smaller beads 114 increase the transmittance of the light filter 130 directly in front of the gaps 520, which makes the gaps 520 less visible.

One process of the present invention for making the light filter 130 is to form a layer of opaque binder material in an unset state, and embed an array of the light transmissive beads 14 into a layer of opaque binder material in the unset state to a selected depth. The beads 14 should each contact a front surface of the layer and protrude from a back surface of the layer. A plurality of smaller beads 114 can then be deposited on exposed portions the layer. Heat and pressure can be applied to cause these smaller beads 114 to move into the gaps 520. Additional pressure can be applied to embed these smaller beads 114 into the layer of opaque binder material. This is preferably done without disrupting a meniscus 111 that forms at the back surface of the opaque binder material because such meniscus 111 helps to increase protrusions of the smaller beads 114 from the back surface (see FIG. 11). The opaque binder material can then be placed into the set state in conventional manner to form the opaque binder layer 16.

It is also in conformance with the present invention to mix a plurality of the beads 14 with a plurality of the smaller beads 114; embed the resultant mixture into a layer of unset opaque binder material; and place the opaque binder material into a set state in conventional manner. Various processes for forming such layers of opaque binder material, and for placing such layers into set and unset states are described above with respect to light filters 120, 122.

The light filters 110, 112, 120, 122, 130 of the present invention include components such as light transmissive beads 14, opaque binder layers 16, and support material 12, which are also included in one or more of the light filters 10, 50, 60, 80. The light transmissive beads 14 are preferably spherical with a radius R of about 20 to 35 microns. The total depth for all opaque binder layers 16 in a light filter is preferably about 0.6 to 1.6 R. Where a layer of support material 12 is included, it typically is about 3000 microns in depth to provide suitable support for the beads 14 but can fall in a range from about 250 microns to 12,000 microns in depth. Various alternative embodiments of these components and the optical and mechanical properties of the components are now discussed in greater detail.

The support material 12 contributes to the characteristics of the light filters 110, 112, 120, 122, 130 in a variety of ways. The index of refraction of the support material 12 affects the angular dispersion of light, and the contrast through its influence on internal reflection. Light absorptive materials can be included in the support material 12 to reduce back reflectance and lateral internal reflectance. For example, use of photochromic glass for the support material 12 automatically increases the absorption and decreases the reflectance of the support material 12 in bright ambient light conditions. Alternatively, the use of electrically active optical material for the support material 12 allows the optical properties to be varied dynamically. The mechanical properties of the support material 12 can also be selected according to the intended application for the light filters 110, 112, 120, 122, 130. For example, plastic support materials 12 reduce weight, and flexible materials, such as plastic films, can be used to produce flexible light filters 110, 112, 120, 122, 130.

The opaque binder layers 16 can be made from a variety of matrix materials. For example, butyl methacrylate polymers readily mix with colorants and their thermoplastic properties provide a simple means for embedding the beads 14. Generally, UV, thermal, and chemically cured resins can be used to produce the opaque binder layers 16.

Beads 14 can be selected from a variety of glass or resin materials. The optimal material and size of the beads 14 may depend on the intended application for light filter 110, 112, 120, 122, 130. Transparent glass or resin materials are available with indices of refraction of between about 1.4 and 2.3, and combinations of materials can be used to provide additional gain control. For example, beads 14 formed by encapsulating electro-optically active materials in glass or resin allow for the adjustment of the optical properties of beads 14 by application of an electric field. The beads 14 can also be composed of photochromic material to allow their optical properties to respond to changes in incident light intensity. Alternatively, colored beads 14 can be used to allow chromatic effects.

The beads 14 are preferably spherical in shape and transparent for many applications of the light filters 110, 112, 120, 122, 130. In most applications, the beads 14 should all have substantially the same size and shape. This beneficially reduces graininess in image light caused by repetitious occurrences of smaller, larger, or misshaped beads 14. The beads 14 having non-spherical shapes such as ellipsoids or rounded rods are preferable in certain instances. For example, such non-spherical beads can be deposited in alignments that disperse light through a greater range of angles horizontally than vertically.

Bead sizes are generally determined to within defined tolerances. Thus a bead described as being spherical and as having a radius R can be slightly non-spherical or have a radius less than or greater than R, provided the bead fits within such tolerances. Often a sieving process is used to determine tolerances, with beads being described as fitting through a first sieve mesh but not through an adjacent and smaller sieve mesh.

Careful selection of beads 14 typically is preferable to eliminate damaged, misshaped, opaque, or frosted beads. Damaged beads 14, particularly those containing facets at points of fracture, can cause uneven refraction of light resulting in bright spots commonly known a sparkle. Opaque or frosted beads 14 can cause dark spots in viewed images. Preliminary sorting of beads 14 can be done using fine screens or meshes. Discolored beads 14 are sometimes ferromagnetic, and when so, can be separated from other beads 14 in a magnetic field. Out-of-round beads 14 can be separated by rolling them down a vibrating plane or allowing them to settle through a vibrating column, relying on the faster passage of round beads. Beads 14 with air inclusion can be separated from others 14 in a liquid solution which allows the former 14 to float. The top layer of beads 14 can then be skimmed off, thus removing the beads 14 with air inclusion.

These various properties and methods of making beads 14 also substantially apply to the smaller beads 114 of light filter 130, except that in any one particular light filter 130, the smaller beads 114 are suitably smaller than the other beads 14. When colored beads 14 are included in light filter 130, the smaller beads 114 should preferably also be colored to provide uniform color filtration of image light.

Therefore, improved light filters of the present invention are presented that use additional layers of light transmissive materials to provide improved control over the optical properties of these light filters. By adjusting the thickness and optical properties of these additional layers, high performance light filters 110, 112, 120, 122, 130 can be produced in which gain control, ambient light rejection, transmittance, and contrast are simultaneously optimized. Various processes of the present invention for making light filters 110, 112, 120, 122, 130 are also presented.

What is claimed is:

1. A light filter, comprising:
    a layer of opaque binder having a front surface and a back surface, the front surface and the back surface being substantially parallel;
    a plurality of light transmissive beads supported in a single-layer array in the layer of opaque binder with portions of the beads protruding through the back surface of said layer of opaque binder to receive light and contacting the front surface of said layer of opaque binder for transmitting the light through the layer of opaque binder; and
    a first layer of light transmissive material affixed to the front surface of the layer of opaque binder, and having focal points well in front of focal points of the beads in order to further filter the light transmitted through the layer of opaque binder while avoiding magnification of the beads.

2. The light filter of claim 1, wherein the first layer of light transmissive material includes a plurality of substantially parallel columnar convex lenses disposed parallel to one another for dispersing the light over a wide viewing angle along a selected direction.

3. The light filter of claim 1, further comprising a second layer of light transmissive material affixed to the back surface of the layer of opaque binder, and the plurality of light transmissive beads, thereby curving over the protruding portions of the plurality of light transmissive beads.

4. The light filter of claim 3, wherein the second layer of light transmissive material has focal points well behind focal points of the beads for avoiding magnification of the beads.

5. A light transmissive filter, comprising:
    a layer of opaque binder having a front surface and a back surface substantially parallel to the front surface;
    a plurality of light transmissive beads supported in a single-layer array in the layer of opaque binder, each bead having a substantially equal radius R, with the beads protruding through the back surface and contacting the front surface; and
    a conformal layer of light transmissive material having a substantially uniform thickness measured normally with respect to the beads of between 0.8R and 1.5R and affixed to the back surface of the layer of opaque binder and protruding portions of the beads, thereby conforming substantially in shape to the protruding portions of the beads, with the back surface of the conformal layer of light transmissive material receiving light and converging the light into the beads, and the beads refracting the light through the layer of opaque binder for viewing.

6. The light filter of claim 5, wherein each bead has a substantially identical index of refraction in a range between one hundred percent and one hundred thirty percent of that of the conformal layer of light transmissive material for increasing transmission of light into the beads.

7. The light filter of claim 5, wherein the beads and the back surface of the conformal layer of light transmissive material each have a center of curvature, and the center of curvature of the back surface of the conformal layer of light transmissive material is behind the center of curvature of the beads for increasing convergence of light into the beads.

8. The light filter of claim 5, wherein the beads and the back surface of the conformal layer each have a center of curvature, and the center of curvature of the back surface of the conformal layer is about equal to the center of curvature of the beads for increasing convergence of light into the beads.

9. The light filter of claim 5, further comprising a substantially flat layer of light transmissive support material affixed to the front surface of the layer of opaque binder for increasing sturdiness of the light filter.

10. A process of making a light filter of opaque binder having a viscous unset set and a substantially rigid set state, light transmissive beads each substantially of a selected radius R, and a layer of light transmissive material having front and back surfaces, a deformable semi-viscous unset set, and substantially rigid set state, the process using a removable support surface and comprising the steps of:
    depositing a layer of the opaque binder on the removeable support surface, the layer of opaque binder being of selected thickness less than the size of the beads, with said layer of the opaque binder being in the viscous unset state;
    arranging a plurality of the light transmissive beads in an array on the layer of the opaque binder;
    penetrating the plurality of light transmissive beads into the layer of opaque binder until the beads contact the support surface;
    placing the opaque binder into the substantially rigid set state for supporting the light transmissive beads in position;
    disposing the front surface of the layer of light transmissive material in the substantially rigid set state on protruding back surfaces of the beads;
    placing the layer of light transmissive material in the deformable semi-viscous unset state;
    applying pressure to the back surface of the layer of light transmissive material to laminate said layer to the protruding back surfaces of the beads, and to conform the back surface of the layer of light transmissive material similarly to the shape of the protruding back surfaces of the beads such that the layer of light transmissive material has a substantially uniform thickness between 0.5R and 1.0R measured normal to the protruding back surfaces of the beads; and
    placing the layer light transmissive material into the set state for binding said layer to the beads.

11. The process of claim 10, further comprising the step of disposing a quantity of a second light transmissive material centrally on the protruding back surface of each bead prior to the step of disposing the layer of light transmissive material in the set state on protruding back surfaces of the beads.

12. A process of making an improved light filter using a refractive light filter having a back surface through which light transmissive beads, each of a radius R, protrude and a layer of light transmissive material having front and back surfaces, a viscous unset set state, and a substantially rigid set state, the process comprising the steps of:

disposing the front surface of the layer of light transmissive material in the set state on protruding back surfaces of the beads;

placing the layer of light transmissive material in the unset state;

applying pressure to the back surface of the layer of light transmissive material to laminate said layer to the beads, and to conform the back surface of said layer similarly to the protruding back surfaces of the beads such that the layer of light transmissive material has a substantially uniform thickness between 0.5R and 1.0R measured normal to the protruding back surfaces of the beads; and placing the layer light transmissive material into the set state for binding said layer to the beads.

13. The process of claim 12, further comprising the step of disposing a quantity of a second light transmissive material centrally on the protruding back surface of each bead prior to the step of disposing the layer of light transmissive material in the set state on protruding back surfaces of the beads.

14. A light filter, comprising:

a layer of opaque binder having a front surface and a back surface substantially parallel to the front surface;

a first plurality of light transmissive beads supported in an array in the layer of opaque binder, with the beads protruding through the back surface to receive light, contacting the front surface to transmit said light through the layer of opaque binder, and being spaced apart at irregular intervals to form a plurality of interstitial gaps therebetween; and a second plurality of light transmissive beads each smaller than the beads of the first plurality and being supported in one of the interstitial gaps in the layer of opaque binder, with the light transmissive beads of the second plurality protruding through the back surface to receive light, and contacting the front surface to transmit said light through the layer of opaque binder, for increasing transmittance of the light filter in front of the interstitial gaps.

15. The light filter of claim 14, wherein the interstitial gaps are spaced apart at substantially random intervals and the beads of the second plurality obscure a resulting grainy appearance caused by such spacing of the interstitial gaps.

16. The light filter of claim 14, wherein the interstitial gaps are spaced apart at intervals which appear quasi-periodic.

17. The light filter of claim 14, wherein each light transmissive bead in the first plurality is a first size and each light transmissive bead in the second plurality is a second size, with the second size being approximately equal to two-thirds the first size.

18. The light filter of claim 14, wherein:

the light transmissive beads of the first plurality each have a substantially equal radius R; and the light transmissive beads of the second plurality each have a substantially equal radius of about two-thirds R.

19. The light filter of claim 14, wherein at least one light transmissive bead of the second plurality protrudes through the back surface of the layer of opaque binder by forming a meniscus in said back surface.

20. A process of making a light filter of opaque binder having a viscous unset state and a substantially rigid set state, light transmissive beads having a first size, and light transmissive beads having a second size that is smaller than the first size, the process using a removable support surface and comprising the steps of:

depositing a layer of the opaque binder of selected thickness in the viscous unset state on the removable support surface;

arranging a plurality of the light transmissive beads having the first size in an array spaced apart at slightly irregular intervals on the layer of the opaque binder;

penetrating the plurality of light transmissive beads having the first size into the layer of opaque binder to the support surface;

locating any interstitial gaps in the layer of the opaque binder resulting from the beads being spaced apart at slightly irregular intervals;

arranging a plurality of the light transmissive beads having the second size in the interstitial gaps;

penetrating the plurality of light transmissive beads having the second size into the layer of opaque binder to the support surface;

placing the opaque binder into the substantially rigid set state for supporting the light transmissive beads of the first and second sizes in position.

21. The process of claim 20, wherein the step of penetrating the plurality of light transmissive beads having the second size into the layer of opaque binder to the support surface further comprises forming meniscuses in said layer with said beads through which said beads protrude to receive image light.

22. A process of making a light filter of opaque binder having a viscous unset state and a substantially rigid set state, light transmissive beads having a first size, and light transmissive beads having a second size that is smaller than the first size, the process using a removable support surface and comprising the steps of:

depositing a layer of the opaque binder of selected thickness in the viscous unset state on the removable support surface;

mixing a plurality of the light transmissive beads having the first size with a plurality of the light transmissive beads of the second size;

depositing a resulting mixture of light transmissive beads of the first and second sizes on the layer of opaque binder;

penetrating both pluralities of light transmissive beads into the layer of opaque binder to the support surface;

placing the opaque binder into the substantially rigid set state for supporting the light transmissive beads of the first and second sizes in position.

23. The process of claim 22, wherein the step of penetrating both pluralities of light transmissive beads further comprises forming meniscuses in said layer with the beads of the second pluralities through which the beads of the second plurality protrude to receive image light.

* * * * *